US012139936B2

(12) United States Patent
Imanuel et al.

(10) Patent No.: US 12,139,936 B2
(45) Date of Patent: Nov. 12, 2024

(54) ELECTRONIC LOCK WITH WIRELESS EXTERIOR TO INTERIOR DOOR COMMUNICATION

(71) Applicant: ASSA ABLOY Americas Residential Inc., New Haven, CT (US)

(72) Inventors: Derek Imanuel, Anaheim, CA (US); Chasen Scott Beck, Costa Mesa, CA (US); Matthew Lovett, Lake Forest, CA (US); Nedal Akram Almomani, Mission Viejo, CA (US)

(73) Assignee: ASSA Abloy Americas Residential Inc., New Haven, CT (US)

( * ) Notice: Subject to any disclaimer, the term of this patent is extended or adjusted under 35 U.S.C. 154(b) by 0 days.

(21) Appl. No.: 17/552,213

(22) Filed: Dec. 15, 2021

(65) Prior Publication Data

US 2023/0003052 A1 Jan. 5, 2023

Related U.S. Application Data

(63) Continuation of application No. 16/094,577, filed as application No. PCT/US2017/027931 on Apr. 17, 2017, now Pat. No. 11,220,844.

(Continued)

(51) Int. Cl.
*E05B 47/00* (2006.01)
*E05B 17/00* (2006.01)
(Continued)

(52) U.S. Cl.
CPC ...... *E05B 47/0001* (2013.01); *E05B 17/0083* (2013.01); *E05B 17/10* (2013.01);
(Continued)

(58) Field of Classification Search
CPC ............. Y10T 70/5097; Y10T 70/7062; Y10T 70/7068; Y10T 70/7102; Y10T 70/713;
(Continued)

(56) References Cited

U.S. PATENT DOCUMENTS

| | | | | |
|---|---|---|---|---|
| 11,220,844 B2 * | 1/2022 | Imanuel | .................. | E05B 47/00 |
| 2007/0033415 A1 * | 2/2007 | Yumoto | ............ | G07C 9/00563 713/186 |

(Continued)

FOREIGN PATENT DOCUMENTS

| | | |
|---|---|---|
| KR | 10-2010-0006365 A | 1/2010 |
| KR | 10-2012-0012413 A | 2/2012 |

(Continued)

OTHER PUBLICATIONS

Search Report for Taiwanese Patent Application No. 106112858, dated Dec. 24, 2020.

(Continued)

*Primary Examiner* — Dionne Pendleton
(74) *Attorney, Agent, or Firm* — Merchant & Gould, P.C.

(57) ABSTRACT

A lockset that includes a latch assembly, an interior assembly and an exterior assembly. The latch assembly includes a bolt movable between an extended position and a retracted position. The interior assembly is configured to electronically control movement of the bolt between the extended position and the retracted position. The exterior assembly includes a locking assembly configured to be mechanically coupled with the latch assembly. The interior assembly includes an interior wireless communication unit and the exterior assembly includes an exterior wireless communication unit that is configured to wirelessly communicate therebetween. In some embodiments, an exterior assembly includes a photovoltaic cell and the interior assembly includes a light source. The light source and the solar cell are (Continued)

configured for wirelessly communicating and for power transmission between the exterior and interior assemblies through a bore hole in the door.

19 Claims, 8 Drawing Sheets

Related U.S. Application Data

(60) Provisional application No. 62/323,888, filed on Apr. 18, 2016.

(51) Int. Cl.
*E05B 17/10* (2006.01)
*G07C 9/00* (2020.01)

(52) U.S. Cl.
CPC .......... *E05B 47/00* (2013.01); *G07C 9/00309* (2013.01); *G07C 9/00944* (2013.01); *E05B 2047/0057* (2013.01); *E05B 2047/0058* (2013.01); *E05B 2047/0064* (2013.01); *E05B 2047/0094* (2013.01); *E05B 2047/0097* (2013.01); *G07C 2009/00325* (2013.01)

(58) Field of Classification Search
CPC ............. Y10T 70/7486; Y10T 70/7107; Y10T 70/7141; E05C 1/16; G07C 9/00309; G07C 9/00563; G07C 9/00571; G07C 9/00857; G07C 9/00944; G07C 2009/00373; G07C 2009/00484; G07C 2009/00841; G07C 2009/00865; G07C 2009/00952; G07C 2009/0096; G07C 2209/08; G07C 9/00174; G07C 9/00658; G07C 9/0069; G07C 9/00817; G07C 9/00896; G07C 9/20; G07C 9/23; G07C 9/25; G07C 9/27; G07C 2009/00325; G07C 9/00904; G07C 9/00912; E05B 2047/0094; E05B 2047/0058; E05B 2047/0062; E05B 2047/0086; E05B 41/00; E05B 47/0012; E05B 47/0615; E05B 49/00; E05B 1/0061; E05B 15/02; E05B 15/1614; E05B 2047/0017; E05B 2047/002; E05B 2047/0031; E05B 2047/0048; E05B 2047/0067; E05B 2047/0071; E05B 2047/0091; E05B 2047/0095; E05B 3/06; E05B 37/00; E05B 47/00; E05B 47/0001; E05B 47/02; E05B 47/026; E05B 47/0607; E05B 47/063; E05B 47/0638; E05B 47/0661; E05B 47/068; E05B 55/005; E05B 59/00; E05B 63/0017; E05B 63/006; E05B 63/08; E05B 63/10; E05B 65/1086; E05B 65/52; E05B 17/0083; E05B 17/10; E05B 2047/0057; E05B 2047/0064; E05B 2047/0097; E05B 15/00; E05B 15/102; E05B 17/226; E05B 2047/0015; E05B 2047/0061; E05B 2047/0068; E05B 2047/0069; E05B 27/0003; E05B 47/0002; E05B 47/0692; E05B 63/00; E05B 63/0056; E05B 63/0069; E05B 63/06; E05B 63/143; E05B 65/0075; C04B 14/06; C04B 14/10; C04B 14/30; C04B 20/008; C04B 20/1074; C04B 20/1085; C04B 2111/00146; C04B 2111/00482; C04B 2111/00637; C04B 2111/28; C04B 2111/34; C04B 2111/60; C04B 2111/62; C04B 2111/70; C04B 2111/72; C04B 22/064; C04B 22/066; C04B 22/142; C04B 22/143; C04B 22/147; C04B 28/02; C04B 40/0608; C04B 40/0641; C04B 40/065; C04B 7/02; Y02P 90/02; Y02P 90/80; H05B 47/105; H05B 47/19; H04Q 9/00; H02S 10/10; H02K 7/116; H02K 7/1853; G08C 17/02; G08C 2201/40; G08C 2201/93; G06K 19/0723; G06K 7/0008; G05B 19/4183; E05Y 2900/60; E05G 1/04; E05G 1/10
See application file for complete search history.

(56) References Cited

U.S. PATENT DOCUMENTS

2010/0180649 A1* 7/2010 Harvey .................. E05B 49/00 70/277
2012/0218076 A1 8/2012 Zacchio
2013/0067969 A1 3/2013 Webb et al.
2014/0118107 A1 5/2014 Almomani
2015/0159402 A1 6/2015 Yahav
2016/0145898 A1 5/2016 Ohi et al.
2016/0258189 A1 9/2016 Frolov
2017/0243425 A1 8/2017 Maganck et al.
2019/0124752 A1* 4/2019 Kelly .................. H05B 47/105

FOREIGN PATENT DOCUMENTS

TW 201447086 A 12/2014
TW 201540925 A 11/2015

OTHER PUBLICATIONS

International Search Report and Written Opinion for PCT/US2017/027931 (dated Sep. 25, 2017).

* cited by examiner

ELECTRONIC LOCK WITH WIRELESS EXTERIOR TO INTERIOR DOOR COMMUNICATION

RELATED APPLICATIONS

This application is a Continuation of U.S. patent application Ser. No. 16/094,577, filed Oct. 18, 2018, now U.S. Pat. No. 11,220,844; which is a National Stage Application of PCT/US2017/027931, filed Apr. 17, 2017 which claims the benefit of U.S. Provisional Application No. 62/323,888, filed Apr. 18, 2016, which applications are incorporated herein by reference. To the extent appropriate, a claim of priority is made to each of the above disclosed applications.

TECHNICAL FIELD

The present disclosure relates generally to locksets. In particular, the present disclosure relates to a lockset that uses exterior to interior communication without cables.

BACKGROUND AND SUMMARY

Existing electronic locksets include wires to electrically connect their exterior and interior assemblies. The wires are used to send electrical signals between the exterior and interior assemblies. For example, the exterior assembly may include a user interface (e.g., a keypad, etc.) for inputting an authentication code, which is communicated to the interior assembly. If the interior assembly determines a valid authentication code was sent, then the interior assembly controls a motor to actuate a bolt between an extended position and a retracted position.

One challenge with the installation of the electronic locksets is electrically connecting the interior and exterior assemblies. This is a challenge because the wires need to be manipulated through a bore hole of a door. In some situations, the wires may become pinched or otherwise damaged during the installation process. As a result, the communication between the exterior and interior assemblies may become unreliable, which can cause the electronic lockset to operate improperly.

According to one aspect, this invention provides a lockset for securing a door with a bore hole. The lockset includes a latch assembly, an interior assembly, and an exterior assembly. The latch assembly includes a bolt movable between an extended position and a retracted position. The interior assembly is configured to electronically control movement of the bolt between the extended position and the retracted position. The exterior assembly includes a locking assembly configured to be mechanically coupled with the latch assembly. The interior assembly includes an interior wireless communication unit and the exterior assembly includes an exterior wireless communication unit that is configured to wirelessly communicate therebetween. In some embodiments, the exterior assembly includes a photovoltaic solar cell and the interior assembly includes a light source. The light source and the solar cell are configured for wirelessly communicating and for power transmission between the exterior and interior assemblies through a bore hole in the door.

BRIEF DESCRIPTION OF THE DRAWINGS

The detailed description makes reference to the accompanying figures in which.

DETAILED DESCRIPTION OF THE DRAWINGS

Figure 1:
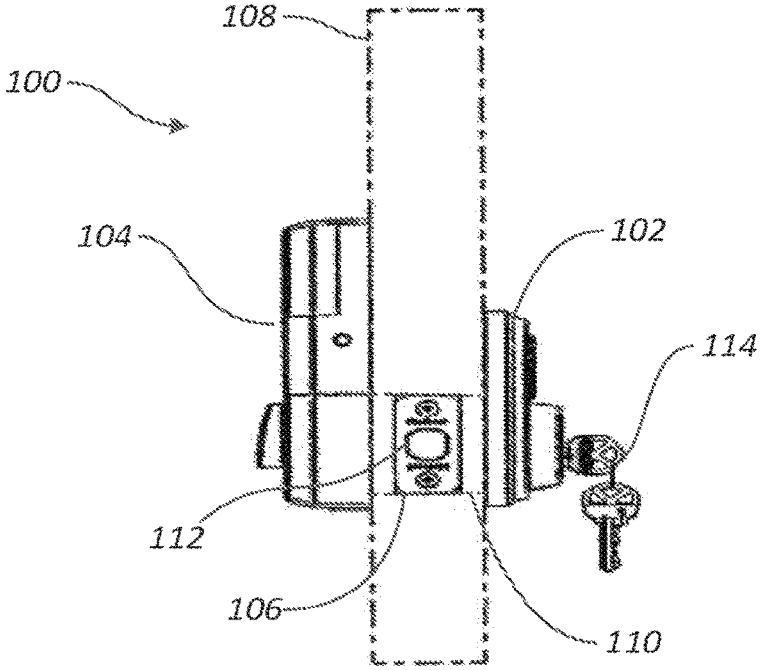
FIG. 1 is a side view of an example electronic lockset system with wireless exterior to interior communication according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 shows an example lockset system 100 according to an embodiment of the disclosure. In the example shown, the lockset system 100 includes an exterior assembly 102, an interior assembly 104, and a latch assembly 106. Typically, the exterior assembly 102 is mounted on the outside of a door 108, while the interior assembly 104 is mounted on the inside of the door 108. The latch assembly 106 is typically mounted in a bore hole 110 formed in the door 108. The bore hole 110 is also used for communication between the exterior assembly 102 and the interior assembly 104. As shown, the latch assembly 106 includes a bolt 112 movable between an extended position and a retracted position. Typically, the extended position relates to a locked position and the retracted position relates to an unlocked position. The term "interior" is broadly used to denote an area inside a door and "exterior" is also broadly used to mean an area outside a door. For example, with an exterior entry door, the exterior assembly 102 may be mounted outside a building and the interior assembly 104 may be mounted inside a building. In another example, with an interior door, the exterior assembly 102 may be mounted on the outside of a secured room located inside a building, and the interior assembly 104 may be mounted inside the secured room. The lockset system 100 is applicable to both interior and exterior doors. The lockset system 100 may also be used in such a way to secure any room with the exterior assembly 102 located on the outside and the interior assembly 104 located on the inside of the room. The lockset system 100 may also be used in a way where the exterior assembly 102 is located on the inside of the door and the interior assembly 104 is located on the outside of the door.

In the embodiment shown, the exterior assembly 102 includes a key hole (not shown) to receive a key 114 to manually actuate the bolt 112 of the latch assembly 106 between the extended position and the retracted position. In one embodiment, the exterior assembly 102 and the interior assembly 104 may wirelessly communicate with each other through the bore hole 110. In some embodiments, the communications between the exterior assembly 102 and the interior assembly 104 could be duplex; embodiments are also contemplated in which the communications may be one-way from the exterior assembly 102 to the interior assembly 104.

Figure 2:
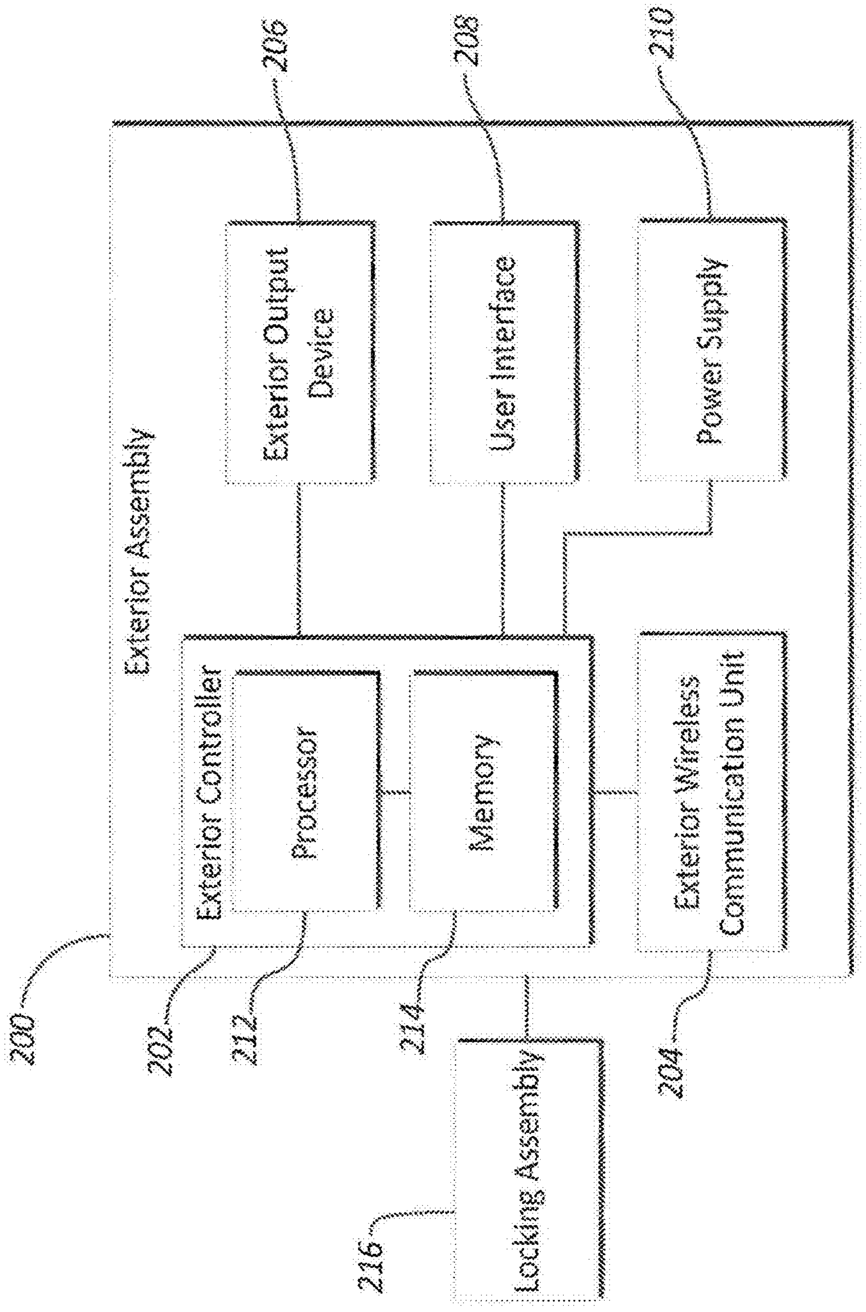
FIG. 2 is a simplified block diagram of an example exterior assembly of the lockset system according to an embodiment of the disclosure.

FIG. 2 shows an example exterior assembly 200 according to an embodiment of the disclosure. In the example shown, the exterior assembly 200 includes an exterior controller 202, an exterior wireless communication unit 204, an exterior output device 206, a user interface 208, and a power supply 210. In the embodiment shown, the exterior controller 202 includes a processor 212 to process the instructions stored in memory 214. In the example shown, the exterior controller 202 is electrically connected to the exterior wireless communication unit 204, exterior output device 206, user interface 208, and power supply 210. As shown, the exterior assembly 200 is also connected to a locking assembly 216. Depending on the circumstances, the locking assembly 216 may be configured to be mechanically coupled with the latch assembly 106 (FIG. 1).

In one embodiment, the exterior wireless communication unit 204 is used for communication with the interior assembly 104 (FIG. 1). In some embodiments, the exterior wireless communication unit 204 may communicate with the interior assembly 104 (FIG. 1) through at least one of visible light, infrared light, audible sound, and/or ultrasound. The exterior wireless communication unit 204 may be embodied as an infrared (i.e., IR) receiver, IR transmitter, and/or IR transceiver. In other embodiments, the exterior wireless communication unit 204 may be any device capable of communicating via visible light, infrared light, audible sound, and/or ultrasound. The exterior controller 202 may send signals to the exterior wireless communication unit 204 to be outputted to the interior assembly 104 (FIG. 1). The exterior wireless communication unit 204 may send received signals to the exterior controller 202 to process with the processor 212.

In one embodiment, the exterior output device 206 may notify a user of the lockset system 100 (FIG. 1) of at least one of a warning condition of the exterior assembly 200, of a confirmed signal received from the interior assembly 104 (FIG. 1), an incorrect authentication code, and a correct authentication code, among other things. In one embodiment, a warning condition may relate to a low battery level, a fault of the exterior assembly 200, or another aspect that the user should be notified of related to the lockset system 100 (FIG. 1). In one embodiment, the exterior output device 206 may be embodied as a light communication device to notify the user through different colors of lights that signify different things. For example, the exterior output device 206 may display a red light to notify the user that there is a warning condition of the exterior assembly 200. In another embodiment, the exterior output device 206 may be embodied as an audible alarm to notify the user through different sounds produced. For example, a negative beep may be produced for an incorrect authentication code or a positive tone may be produced for a correct authentication code. In addition, the audible alarm may also produce phrases for the notifications. In another embodiment, the exterior output device 206 may include LED lights that indicate the battery level of the exterior assembly 200.

In one embodiment, the user interface 208 may receive input from the user such as an authentication code to send to the interior assembly 104 (FIG. 1). The user interface 208 may be embodied as a keypad or a touch surface or any other input device to receive a user input. If the user interface 208 is embodied as a keypad, the user interface 208 may have a plurality of user-selectable buttons that initiates wireless authentication with the interior assembly 104 (FIG. 1) through the exterior wireless communication unit 204. The user interface 208 sends the signals received from the user to the exterior controller 202. The exterior controller 202 may process the signals received from the user interface 208 prior to sending a signal to the interior assembly 104 (FIG. 1) through the exterior wireless communication unit 204. The exterior controller 202 may also send the signals received from the user interface 208 to the interior assembly 104 (FIG. 1) through the exterior wireless communication unit 204 to process. Upon a valid authentication code being input into the user interface 208, the exterior controller 202 may send the valid authentication code to the interior assembly 104 (FIG. 1). In another embodiment, the user interface 208 may include a plurality of input devices to receive user input.

In the embodiment shown, the power supply 210 is electrically connected to the exterior controller 202. The exterior controller 202 powers the other electrical components 204, 206, 208 (e.g., the exterior wireless communication unit, exterior output device, and user interface) through the power supply 210. In another embodiment, the power supply 210 may be directly connected to the electrical components 204, 206, 208. The power supply 210 may have other components to convert the power supplied to each of the components. In the example shown, the power supply 210 is located in the exterior assembly 200. In another embodiment, the power supply 210 may be located outside of the exterior assembly 200 to power the exterior assembly 200 and its components 202, 204, 206, 208. In one embodiment, the power supply 210 may be embodied as batteries to supply power to the exterior assembly 200. In another embodiment, the power supply 210 may be embodied as any device capable of providing power to the electrical components 202, 204, 206, 208.

Figure 3:
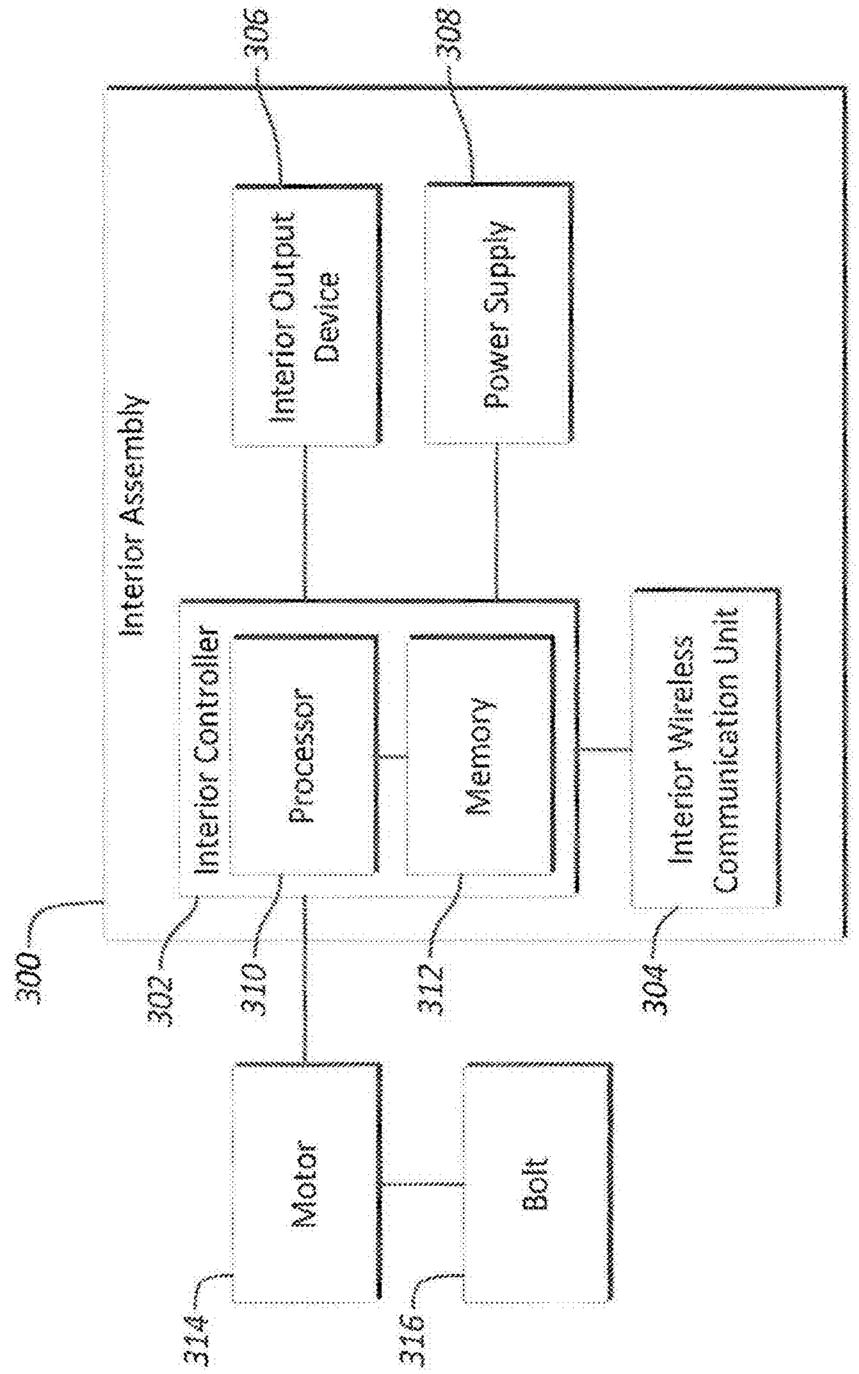
FIG. 3 is a simplified block diagram of an example interior assembly of the lockset system according to an embodiment of the disclosure.

FIG. 3 shows an example interior assembly 300 according to an embodiment of the disclosure. In the example shown, the interior assembly 300 includes an interior controller 302, an interior wireless communication unit 304, an interior output device 306, and a power supply 308. In the embodiment shown, the interior controller 302 includes a processor 310 to process instructions stored in memory 312. In the example shown, the interior controller 302 is electrically connected to the interior wireless communication unit 304, the interior output device 306, the power supply 308, and a motor 314. The motor 314 is operably connected to a bolt 316 (e.g., similar to bolt 112) that is a part of the latch assembly 106 (FIG. 1). The motor 314 may actuate the bolt 316 between the extended position and the retracted position. The interior controller 302 may send a signal to the motor 314 to actuate the bolt between the extended position and the retracted position. In another embodiment, the motor 314 may be included in the interior assembly 300.

In one embodiment, the interior wireless communication unit 304 is used for communication with the exterior assembly 200 (FIG. 2) through the exterior wireless communication unit 204 (FIG. 2). In some embodiments, the interior wireless communication unit 304 may communicate with the exterior wireless communication unit 204 (FIG. 2) through at least one of visible light, infrared light, audible sound, or ultrasound. The interior wireless communication unit 304 may be embodied as an IR receiver, IR transmitter, or IR transceiver. In other embodiments, the interior wireless communication unit 304 may be any device to communicate via visible light, infrared light, audible sound, and/or ultrasound. The interior controller 302 may send signals to the interior wireless communication unit 304 to be outputted to the exterior wireless communication unit 204 (FIG. 2). The interior wireless communication unit 304 may receive signals from the exterior wireless communication unit 204 (FIG. 2) and send the received signals to the interior controller 302 to process. In one embodiment, the interior wireless communication unit 304 may receive signals from the exterior wireless communication 204 (FIG. 2) regarding the status of the exterior assembly 200 (FIG. 2). The interior wireless communication unit 304 may send the received signals regarding the status of the exterior assembly 200 (FIG. 2) to the interior controller 302 to process. The interior controller 302 may send confirmation signals to the exterior controller 202 (FIG. 2) through the interior wireless communication unit 304 to the exterior wireless communication unit 204 (FIG. 2) for receiving signals from the exterior wireless communication unit 204 (FIG. 2).

In one embodiment, the interior output device 306 may notify the user of the lockset 100 (FIG. 1) of at least one of a warning condition of the exterior assembly 200 (FIG. 2) or a warning condition of the interior assembly 300, among other things. In one embodiment, a warning condition may relate to a low battery level of the interior assembly 300, a low battery level of the exterior assembly 200 (FIG. 2), a fault of the interior assembly 300, a fault of the exterior assembly 200 (FIG. 2), or another aspect that the user should be notified of related to the lockset system 100 (FIG. 1). In one embodiment, the interior output device 306 may be embodied as a light communication device to notify the user through different colors of lights that signify different things. For example, the interior output device 306 may display a red light to notify the user of a warning condition of the exterior assembly 200 (FIG. 2). In another embodiment, the interior output device 306 may be embodied as an audible alarm to notify the user through different sounds produced. In another embodiment, the interior assembly 300 may have two interior output devices. One interior output device 306 relates to the interior assembly 300 and the other interior output device (not shown) relates to the exterior assembly 200 (FIG. 2). In another embodiment, the interior output device 306 may include LED lights that indicate the battery level of the interior assembly 300. In another embodiment the interior output device 306 may include LED lights that indicate the battery level of the exterior assembly 200 (FIG. 2).

In the embodiment shown, the power supply 308 is electrically connected to the interior controller 302. The interior controller 302 powers the other electrical components 304, 306 (e.g., the interior wireless communication unit 304 and interior output device 306). In another embodiment, the power supply 308 may be directly connected to the electrical components 304, 306. The power supply 308 may have other components to convert the power supplied to each of the components. In the example shown, the power supply 308 is located in the interior assembly 300. In another embodiment, the power supply 308 may be located outside of the interior assembly 300 to power the interior assembly 300 and its components 304, 306. In one embodiment, the power supply 308 may be embodied as batteries to supply power to the interior assembly 300. In another embodiment, the power supply 308 may be embodied as any device capable of providing power to the electrical components 302, 304, 306.

In one embodiment, the interior controller 302 may receive an authentication code from the exterior controller 202 (FIG. 2) through the exterior wireless communication unit 204 (FIG. 2). If the interior controller 302 receives a valid authentication code from the exterior controller 202 (FIG. 2) then the interior controller 302 may send a signal to the motor 314 to actuate the bolt 316 between the extended position and the retracted position. The interior controller 302 may also send a confirmation signal to the exterior controller 202 (FIG. 2) through the interior wireless communication unit 304 to the exterior wireless communication unit 202 (FIG. 2) for the exterior controller 202 (FIG. 2) to notify the user of the valid authentication code as described above.

In one embodiment, the interior controller 302 may receive status signals regarding the exterior assembly 200 (FIG. 2) from the exterior controller 202 (FIG. 2). The interior controller 302 may process the signals received and determine if there is a warning condition as described above. If the interior controller 302 determines a warning condition is present, such that a parameter regarding a warning condition exceeds a predetermined threshold, then the interior controller 302 outputs a notification through the interior output device 306. The notification may be used to allow a user of the lockset system 100 (FIG. 1) to know that there may be a fault in the system or a low battery level issue to consider.

In one embodiment, the exterior controller 202 may determine that the interior controller 302 has not received signals sent by the exterior controller 202 through the exterior wireless communication unit 204. After a determination that the interior controller 302 has not received signals sent by the exterior controller 202, the exterior controller 202 may attempt to resend the signals received from the user interface 208 to the interior controller 302. The exterior controller 202 may then output through the exterior output device 206 that the interior controller 302 has not received the signals sent by the exterior controller 202. The signals may not have been received either through a fault or maybe an obstruction in the way of communication with the bore hole 110. The exterior controller 202 may also temporarily store the signals received from the user interface 208 to reattempt to send the signals after a failed attempt at communicating with the interior controller 302. The exterior controller 202 may also process the signals to send a signal of a valid authentication code instead if the first attempt to communicate with the interior controller 302 failed.

In one embodiment, the communication between the exterior wireless communication unit 204 and the interior wireless communication unit 304 may be means for short field communication. The short field communication means may include the exterior wireless communication unit 204 and the interior wireless communication unit 304. In one embodiment, the short field communication means is capable of the functions described by the exterior communication unit 204 and the interior wireless communication unit 304. The short field communication means includes communication via at least one of visible light, infrared light, audible sound, or ultrasound. The short field communication means may include any device to achieve communication via at least one of visible light, infrared light, audible sound, or ultrasound. The communication between the exterior wireless communication unit 204 and the interior wireless communication unit 304 may be encoded. The exterior controller 202 and the interior controller 302 may encode the signals sent through the exterior wireless communication unit 204 and the interior wireless communication unit 304 to be decoded by a receiving controller 202 or 302. For example, if the exterior controller 202 sends an encoded signal through the exterior wireless communication unit 204, then the interior wireless communication unit 304 receives the encoded signal to be decoded by the interior controller 302.

Figure 4A:
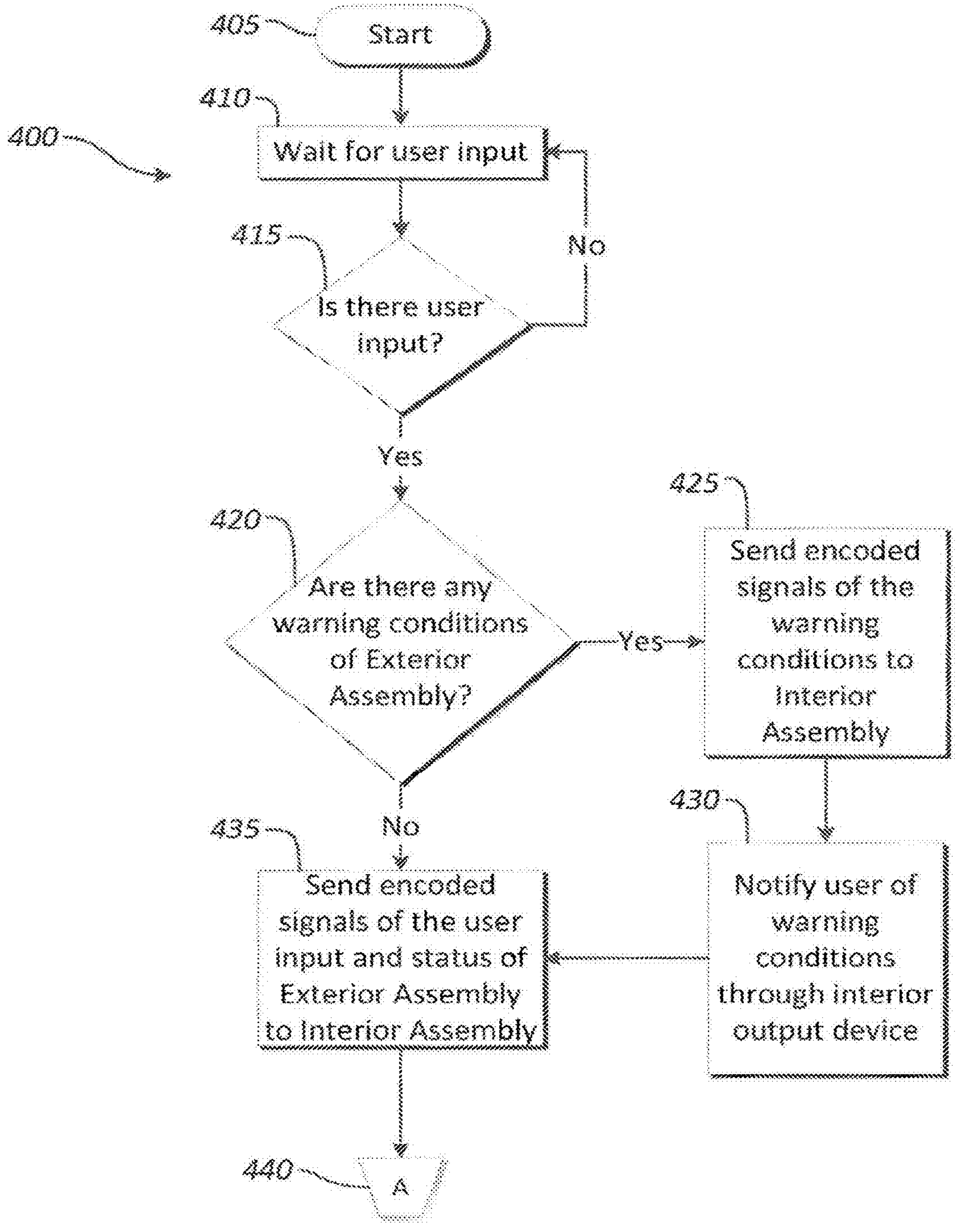
FIGS. 4A-4B together are a simplified flowchart showing an example operation of the exterior assembly of the lockset system according to an embodiment of the disclosure.

FIG. 4A is a first part of a simplified flow chart showing an example operation of the exterior assembly 200. In the shown example, the method of operation 400 begins with operation 405 to initiate the process. After operation 405, the process continues to operation 410 where the exterior assembly 200 waits for an input from the user interface 208. After operation 410, the process continues to operation 415 where the exterior controller 202 checks the user interface 208 for user input. If there is no user input, the process returns to operation 410 to wait for the user input from the user interface 208. If there is a user input, the process continues to operation 420 where there is an evaluation from the exterior controller 202 on the exterior assembly 200 to see if there are any present warning conditions as described above. If there are warning conditions present, the process continues to operation 425 where the exterior controller 202 sends encoded signals of the warning conditions to the interior assembly 300 through the exterior wireless communication unit 204 to the interior wireless communication unit 304. More specifically, the exterior controller 202 sends encoded signals of the warning conditions to the interior controller 302 of the interior assembly 300. In another embodiment, the signals may be sent without being encoded.

After operation 425, the process continues to operation 430 where the interior controller 302 sends a signal to the interior output device 306 to notify the user of the warning condition. The interior output device 306 allows the user to know that there may be a fault or low battery level condition or another warning condition of the lockset system 100. In another embodiment, the exterior controller 202 may perform operations 420, 425, and 430 independently from a user input. The exterior controller 202 may periodically check for warning conditions of the exterior assembly 200 to send to the interior controller 302. The exterior controller 202 may also periodically send status updates to the interior controller 302. If there are no warning conditions of the exterior assembly 200, then the process continues to operation 435 where the exterior controller 202 sends encoded signals of the user input and status of the exterior assembly 200. In another embodiment, the exterior controller 202 may only send the encoded signals of the user input to the interior controller 302 when receiving user input from the user interface 208. In another embodiment, the exterior controller 202 may send the signals from the user interface 208 without being encoded to the interior controller 302. After operation 435, the process continues on to operation 440 where the method of operation 400 continues from FIG. 4A to FIG. 4B.

Figure 4B:
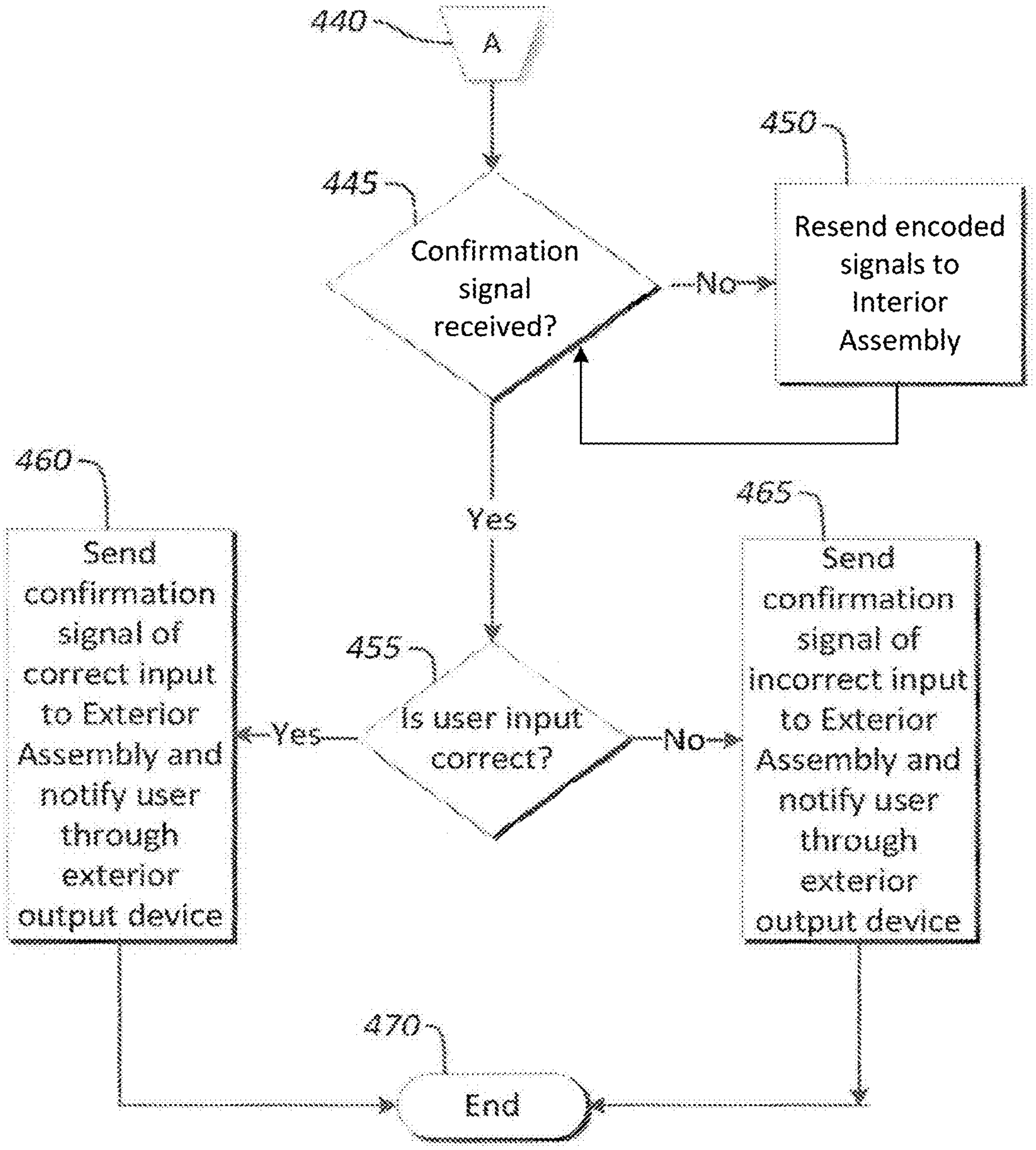

FIG. 4B is a second part of the simplified flow chart showing the example operation of the exterior assembly 200. In the shown example, the method of operation 400 continues with operation 440 to continue the process from FIG. 4A. After operation 440, the process continues to operation 445 where the exterior controller 202 checks to see if it received a confirmation signal from the interior controller 302. In an example, the exterior controller 202 uses the confirmation signal to if the interior controller 302 received signals from the exterior controller 202 through the interior wireless communication unit 304 from the exterior wireless communication unit 204. If it is determined that the exterior controller 202 did not receive a confirmation signal from the interior controller 302, then the process continues to operation 450 where the exterior controller 202 attempts to resend the signals. In some examples, the user is notified that the interior assembly 300 did not receive any signals through the exterior output device 206 during operation 450. After resending the signals in operation 450, the process may return to operation 445 to check for the exterior controller 202 to check for a confirmation signal from the interior controller 302. If the exterior controller 202 did receive the confirmation signals, then the process continues to operation 455 where the interior controller 302 verifies that the signals sent were a valid authentication code. In another embodiment, if the interior assembly 300 only received a status update or a warning condition from the exterior assembly 200, then the interior assembly may send back a confirmation signal. If it is determined that the user input is correct and is a valid authentication code, then the process continues to operation 460 where the interior controller 302 sends a confirmation signal of correct input to the exterior assembly 200 and the exterior assembly 200 will notify the user of a valid authentication code through the exterior output device 206 as described above. If it is determined that the user input is incorrect and is an invalid authentication code, then the process continues to operation 465 where the interior controller 302 sends a confirmation signal of an incorrect input to the exterior assembly 200, and the exterior assembly 200 will notify the user of an invalid authentication code through the exterior output device 206 as described above. After the user is notified of either an incorrect or correct input, the process continues to operation 470 where the method of operation 400 ends.

Figure 5A:
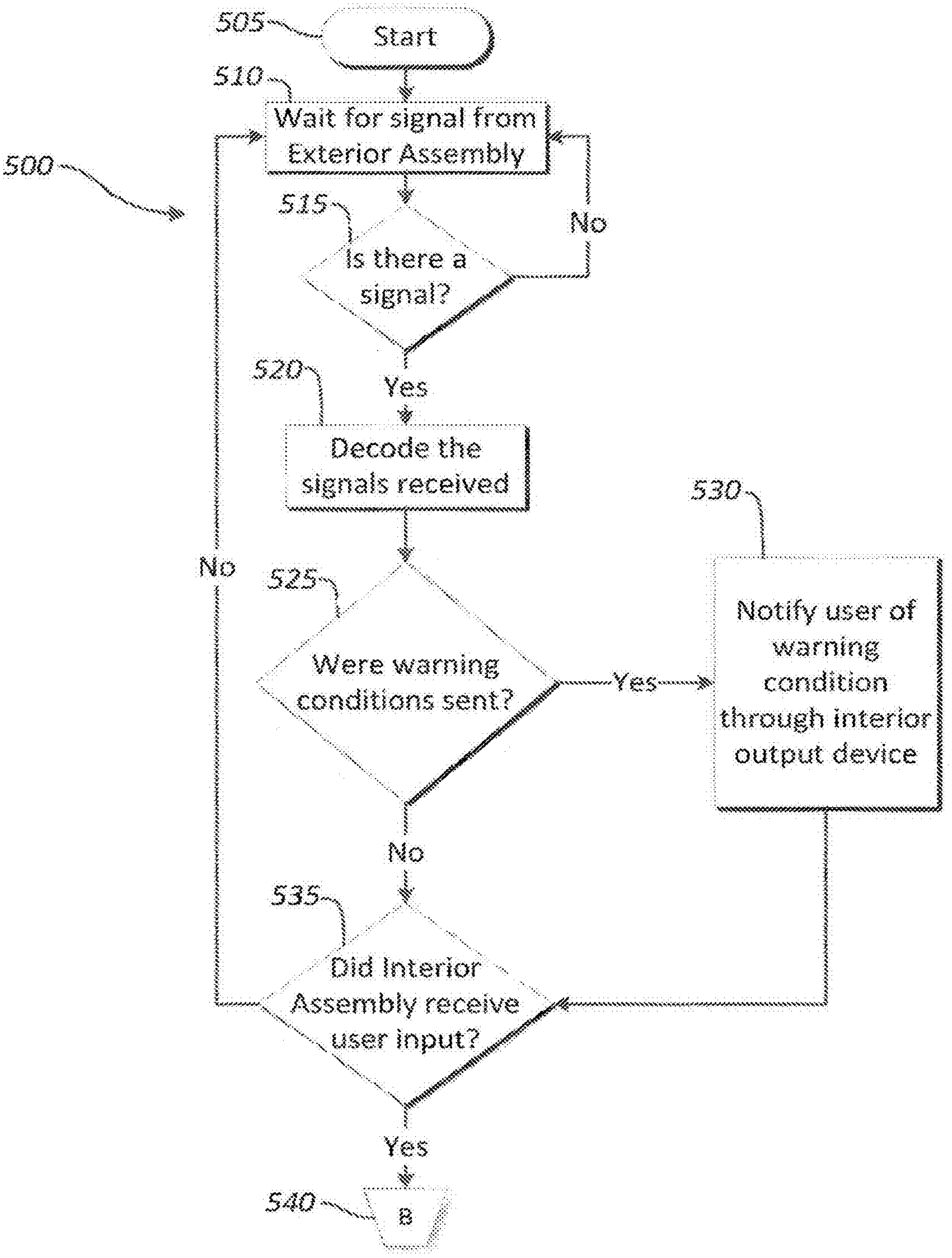
FIGS. 5A-5B together are a simplified flowchart showing an example operation of the interior assembly of the lockset system according to an embodiment of the disclosure.

FIG. 5A is a first part of a simplified flow chart showing an example operation of the interior assembly 300. In the shown example, the method of operation 500 begins with operation 505 to initiate the process. After operation 505, the process continues to operation 510 where the interior assembly 300 waits for signals from the exterior assembly 200. In one embodiment, the interior controller 302 may be waiting to receive a signal from the exterior assembly 200 through the interior wireless communication unit 304. In one embodiment, the signals may be at least one of a user input, a status update of the exterior assembly 200, or a warning condition of the exterior assembly 200. After operation 510, the process continues to operation 515 where the interior controller 302 checks to see if there is a signal received from the exterior controller 202 through the exterior wireless communication unit 204 to the interior wireless communication unit 304. If there is no signal received, the process returns to operation 510 for the interior assembly 300 to wait for a signal from the exterior assembly 200. If the interior assembly 300 does receive a signal, then the process continues to operation 520 where the interior controller 302 decodes the signals received. In another embodiment, the interior controller 302 may just receive the signals if the signals are not encoded. After operation 520, the process continues to operation 525 where the interior controller 302 checks to see if any warning conditions were sent. In another embodiment, the interior controller 302 may also wait to receive warning conditions separately from waiting for a user input. The interior controller may receive status updates of the exterior assembly 200 in conjunction with the user input. If warning conditions were sent, the process continues to operation 530 where the interior assembly 300 will notify the user of a warning condition through the interior output device 306 as described above. If warning conditions were not sent by the exterior assembly 200 or the user was notified of the warning condition through the interior output device 306, the process continues to operation 535 where there is a check to see if the interior assembly 300 received user input from the exterior assembly 200. If there is no user input received, the process returns to operation 510 where the interior assembly 300 waits for a signal from the exterior assembly 200. If the interior assembly 300 received user input from the exterior assembly 200, the process continues to operation 540 where the method of operation 500 continues from FIG. 5A to FIG. 5B.

Figure 5B:
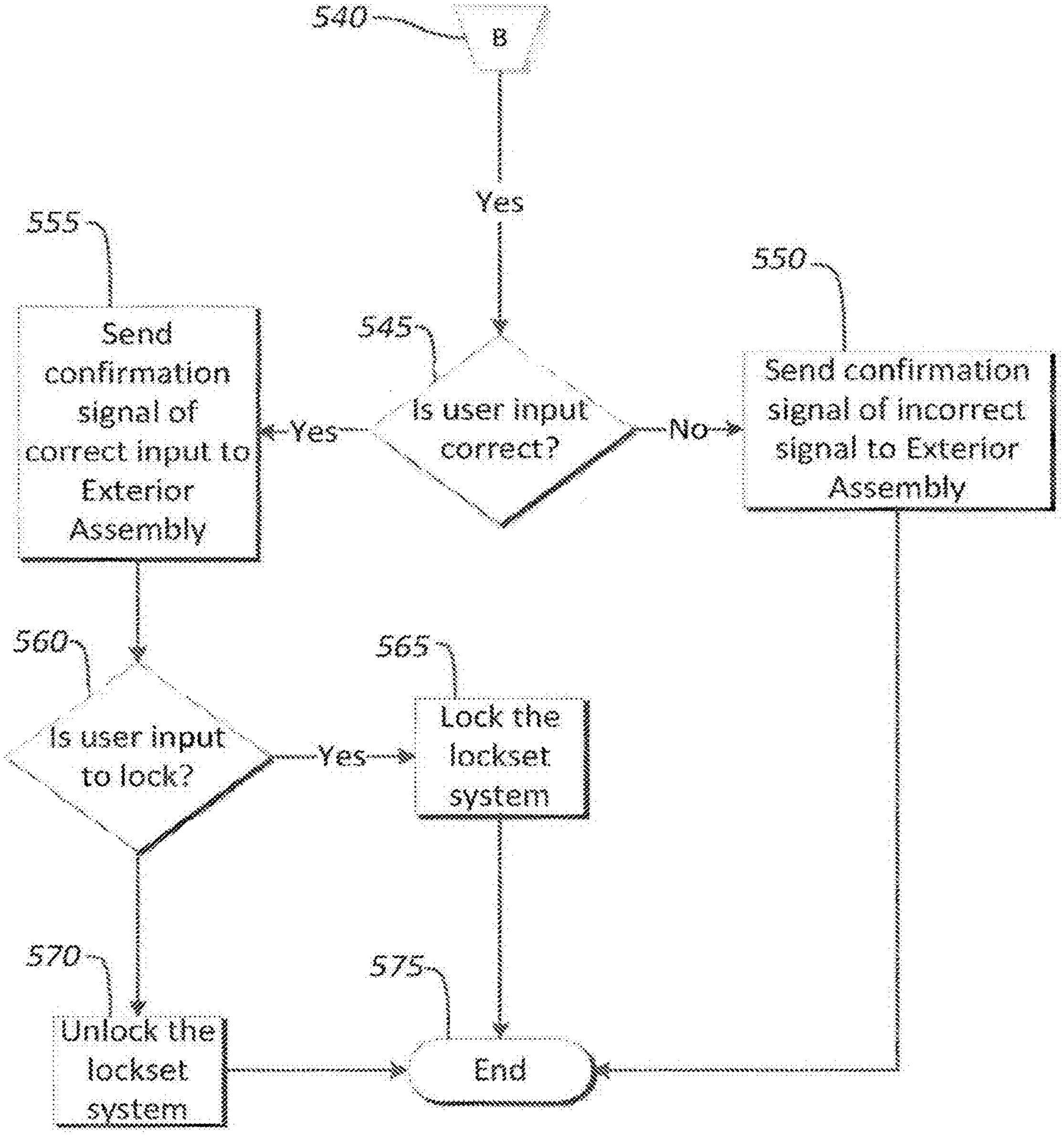

FIG. 5B is a second part of the simplified flow chart showing the example operation of the interior assembly 300. In the shown example, the method of operation 500 continues with operation 540 to continue the process from FIG. 5A. After operation 540, the process continues to operation 545 where the interior controller 302 verifies that the user input is correct and is a valid authentication code. If the user input is an incorrect signal and an invalid authentication code, then the process continues to operation 550 where the interior controller 302 sends a confirmation signal of an incorrect signal to the exterior assembly 200 through the interior wireless communication unit 304 to the exterior wireless communication unit 204. If the user input is a correct signal, then the process continues to operation 555 where the interior controller 302 sends a confirmation signal of the correct signal to the exterior assembly 200 through the interior wireless communication unit 304 to the exterior wireless communication unit 204. After operation 555, the process continues to operation 560 where the interior controller 302 processes the signal and determines whether the user input was to lock the lockset system 100 or to unlock the lockset system 100. If it is determined that the user input is to lock the lockset system 100, then the process continues to operation 565 where the interior controller 302 sends a signal to the motor 314 to actuate the bolt 316 to a locked position. If it is determined that the user input is to unlock the lockset system 100, then the process continues to operation 570 where the interior controller 302 sends a signal to the motor 314 to actuate the bolt 316 to an unlocked position. After the position of the bolt 316 is in the correct position in accordance to the user input sent by the exterior assembly 200, the process continues to operation 575 where the method of operation 500 ends.

Figure 6:
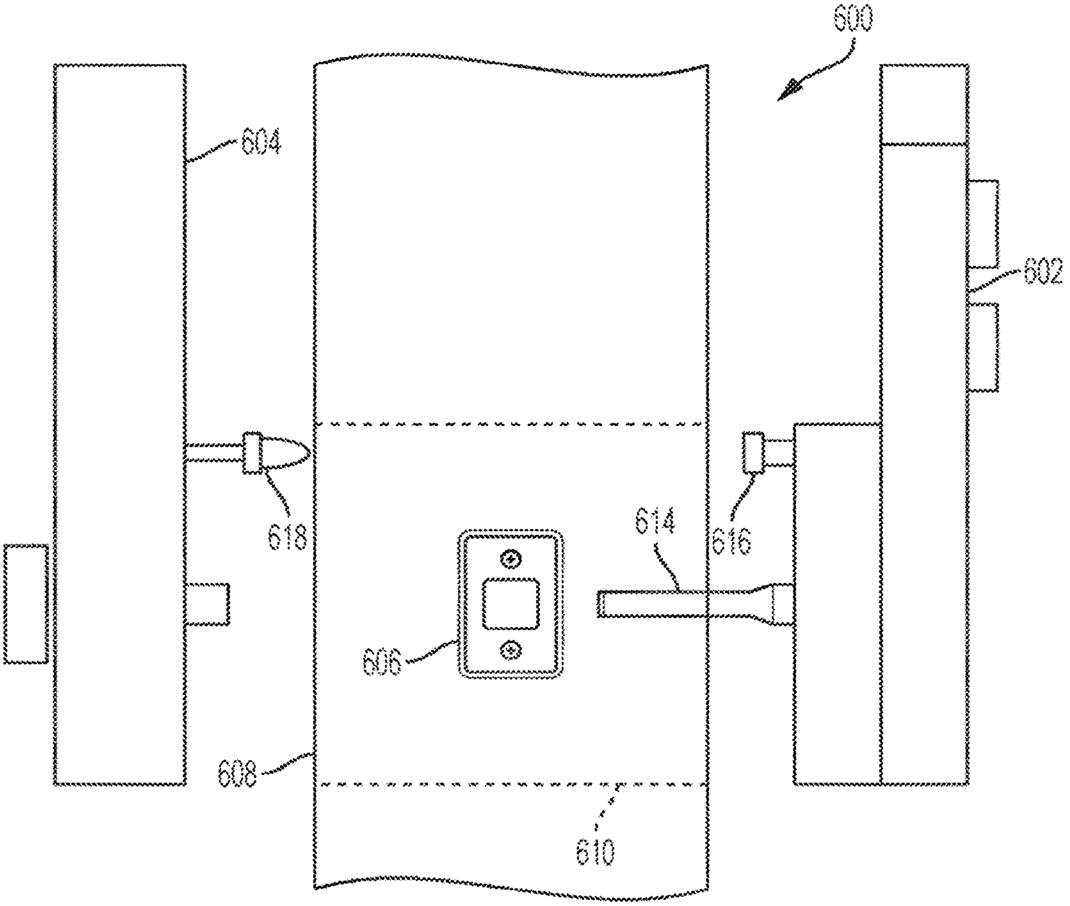
FIG. 6 is an exploded, cross-sectional view of an example electronic lockset system with wireless exterior to interior communication according to an embodiment of the disclosure.

FIG. 6 shows an example lockset system 600 according to an embodiment of the disclosure. In the example shown, the lockset system 600 includes an exterior assembly 602, an interior assembly 604, and a latch assembly 606. Typically, the exterior assembly 602 is mounted on the outside of a door 608, while the interior assembly 604 is mounted on the inside of the door 608. The latch assembly 606 is typically mounted in a bore hole 610 formed in the door 608. The bore hole 610 is also used for communication between the exterior assembly 602 and the interior assembly 604. In this embodiment, the lockset system 600 includes a solar cell 616 and a light source 618 (depicted for purposes of example in FIG. 6 as an LED light source).

The solar cell 616 is coupled to the exterior assembly 602 such that it can receive light from the light source 618 that is coupled to the interior assembly 604. The solar cell 616 may be any commercially available solar cell, such as 4.5 V photovoltaic solar cell. With a sufficiently powerful light source, such as a 10,000 millicandela white LED from Lumen Opt (Part No. SSL-LX100133XUWC), the light source 618 can power the exterior assembly 602. For example, the lockset system 600 may include electrical storage capacity (such as power supply 210 described with reference to FIG. 2) on the exterior assembly 602. In some embodiments, light source 618 may be activated to provide power to the exterior assembly 602 by way of the solar cell 616 when the electrical storage capacity levels reach below a voltage threshold or some other threshold that indicates low power.

In addition to providing power to the exterior assembly 602, the light source 618 may allow the interior assembly 604 and the exterior assembly 602 to communicate data. By way of example only, the data communicated between the exterior assembly 602 and the interior assembly 604 could include user input for authentication, user input for configuration, electrical storage levels on the exterior assembly 604, as well as the communications described herein with reference to FIGS. 1, 2, 3, 4 A, 4B, 5 A, and 5B. The lockset system 600 may also include similar components, and may also include similar operation, as the lockset systems shown and described herein with reference to FIGS. 1, 2, 3, 4 A, 4B, 5 A, and 5B.

The latch assembly 606 may include a bolt 612 (e.g., similar to bolt 112) movable between an extended position and a retracted position. Typically, the extended position relates to a locked position and the retracted position relates to an unlocked position. The exterior assembly may include a tail piece 614 that moves the bolt or the latch assembly 606 between the extended position and the retracted position. The term “interior” is broadly used to denote an area inside a door and “exterior” is also broadly used to mean an area outside a door. For example, with an exterior entry door, the exterior assembly 602 may be mounted outside a building and the interior assembly 604 may be mounted inside a building. In another example, with an interior door, the exterior assembly 602 may be mounted on the outside of a secured room located inside a building, and the interior assembly 604 may be mounted inside the secured room. The lockset system 600 is applicable to both interior and exterior doors. The lockset system 600 may also be used in such a way to secure any room with the exterior assembly 602 located on the outside and the interior assembly 604 located on the inside of the room. The lockset system 600 may also be used in a way where the exterior assembly 602 is located on the inside of the door and the interior assembly 604 is located on the outside of the door.

In the embodiment shown, the exterior assembly 602 includes a key hole (not shown) to receive a key (similar to key 114) to manually actuate the bolt 612 of the latch assembly 606 between the extended position and the retracted position. In one embodiment, the exterior assembly 602 and the interior assembly 604 may wirelessly communicate with each other through the bore hole 610. In some embodiments, the communications between the exterior assembly 602 and the interior assembly 604 could be duplex (e.g., with a light source coupled to the exterior assembly and a solar cell or receiver coupled to the interior assembly); embodiments are also contemplated in which the communications may be one-way from the exterior assembly 602 to the interior assembly 604.

EXAMPLES

Illustrative examples of the lockset disclosed herein are provided below. An embodiment of the lockset may include any one or more, and any combination of, the examples described below.

Example 1 is a lockset for securing a door with a bore hole. The lockset includes a latch assembly including a bolt movable between an extended position and a retracted position. The lockset includes an interior assembly configured to electronically control movement of the bolt between the extended position and the retracted position, wherein the interior assembly includes an interior wireless communication unit. The lockset includes an exterior assembly including a locking assembly configured to be mechanically coupled with the latch assembly, wherein the exterior assembly includes an exterior wireless communication unit. The interior wireless communication unit and the exterior wireless communication unit are configured to communicate therebetween.

In Example 2, the subject matter of Example 1 is further configured such that the interior wireless communication unit and the exterior wireless communication unit are configured to communicate through a bore hole of a door.

In Example 3, the subject matter of Example 2 is further configured such that the interior wireless communication unit and the exterior wireless communication unit include IR transceivers that are configured to communicate therebetween through a bore hole of a door.

In Example 4, the subject matter of Example 2 is further configured such that the interior wireless communication unit and the exterior wireless communication unit include ultrasonic transceivers that are configured to communicate therebetween through a bore hole of a door.

In Example 5, the subject matter of Example 1 is further configured such that the exterior assembly includes a keypad and the exterior wireless communication unit is configured to wirelessly transmit user input on the keypad to the interior wireless communication unit.

In Example 6, the subject matter of Example 1 is further configured such that the interior assembly is configured to generate one or more output signals for changing one or more parameters of a user interface on the exterior assembly, and the interior wireless communication unit is configured to wirelessly transmit the output signals to the exterior wireless communication unit.

Example 7 is a lockset that includes a latch assembly including a bolt movable between an extended position and a retracted position, an interior assembly, and an exterior assembly. The interior assembly includes a motor configured to move the bolt between the extended position and the retracted position. The interior assembly includes an interior controller configured to electronically control the motor to control movement of the bolt between the extended position and the retracted position responsive to receiving a valid authentication code. The interior assembly includes an interior wireless communication unit in electrical communication with the interior controller. The exterior assembly includes at least one user interface for communicating the authentication code to the interior controller with an exterior controller in electrical communication with an exterior wireless communication unit. The exterior assembly includes a mechanical lock assembly configured to manually move the bolt between the extended position and the retracted position.

In Example 8, the subject matter of Example 7 is further configured such that the at least one user interface communicates a status of the user interface to the interior controller through the exterior wireless communication unit.

In Example 9, the subject matter of Example 7 is further configured such that the at least one user interface communicates a warning condition indicative of at least one of a low battery level or a fault to the interior controller through the exterior wireless communication unit.

In Example 10, the subject matter of Example 8 is further configured by comprising an interior output device to notify of the warning condition.

In Example 11, the subject matter of Example 7 is further configured such that the interior controller sends a confirmation of communication to the exterior controller through the interior wireless communication unit when receiving communication from the exterior controller through the exterior wireless communication unit.

In Example 12, the subject matter of Example 11 is further configured by comprising an exterior output device to notify of failed communication when the interior controller does not send the confirmation of communication to the exterior controller through the interior wireless communication unit when receiving communication from the exterior controller through the exterior wireless communication unit.

In Example 13, the subject matter of Example 7 is further configured such that the communication between the interior wireless communication unit and the exterior wireless communication unit is encoded.

In Example 14, the subject matter of Example 7 is further configured such that the at least one user interface includes a keypad including a plurality of user-selectable buttons that initiates wireless authentication with the interior controller through the exterior wireless communication unit.

In Example 15, the subject matter of Example 14 is further configured such that the exterior controller processes input from the keypad to determine if the input is a valid authentication code and, if the input is the valid authentication code, the exterior controller sends the interior controller the valid authentication code through the exterior wireless communication unit.

In Example 16, the subject matter of Example 14 is further configured such that the exterior controller sends input received from the keypad to the interior controller through the exterior wireless communication unit for the interior controller to process to determine if the input is the valid authentication code.

In Example 17, the subject matter of Example 7 is further configured such that the communication between the interior wireless communication unit and the exterior wireless communication unit is through at least one of visible light, infrared light, audible sound, or ultrasound.

In Example 18, the subject matter of Example 7 is further configured such that, responsive to the interior controller receiving the valid authentication code from the at least one user interface through the exterior controller in electrical communication with the exterior wireless communication unit, the interior controller sends a signal to the motor to control movement of the bolt between the extended position and the retracted position.

Example 19 is a system for wireless communication through a bore hole of a door. The system includes a latch assembly including a bolt movable between an extended position and a retracted position. The system includes an interior assembly configured to electronically control movement of the bolt between the extended position and the retracted position. The system includes an exterior assembly including a locking assembly configured to be mechanically coupled with the latch assembly. The system includes short field communication means for wirelessly communicating between the exterior and interior assemblies through the bore hole.

In Example 20, the subject matter of Example 19 is further configured such that the exterior assembly includes a user interface and the short field communication means is configured to wirelessly transmit user input to the interior assembly.

In Example 21, the subject matter of Example 20 is further configured such that the short field communication means is configured to wirelessly transmit a status of the user interface to the interior assembly.

Example 22 is a system for wireless communication and power through a bore hole of a door. The system includes a latch assembly including a bolt movable between an extended position and a retracted position. The system includes an interior assembly including a light source and configured to control movement of the bolt between the extended position and the retracted position. The system includes an exterior assembly including a photovoltaic solar cell and a locking assembly configured to be mechanically coupled with the latch assembly. The light source and the solar cell are configured for wirelessly communicating and for power transmission between the exterior and interior assemblies through the bore hole.

In Example 23, the subject matter of Example 22 is further configured such that the exterior assembly includes a power source.

In Example 24, the subject matter of Example 23 is further configured such that the interior assembly is configured to activate the light source to charge the power source based on receiving a low power indication from the exterior assembly.

In Example 25, the subject matter of Example 24 is further configured such that the low power indication is based on the power source reaching a voltage threshold.

In Example 26, the subject matter of Example 22 is further configured such that the exterior assembly includes a user interface and the exterior assembly is configured to wirelessly transmit user input to the interior assembly.

In Example 27, the subject matter of Example 26 is further configured such that the exterior assembly is configured to transmit wirelessly transmit a status of the user interface to the interior assembly.

Example 28 provides a method of operating a system for wirelessly communicating through a bore hole of a door. The method includes receiving an input through at least one user interface on an exterior assembly for authentication of a user. The method includes communicating the input from an exterior wireless communication unit of the exterior assembly through the bore hole to an interior wireless communication unit of an interior assembly. The method includes authenticating the user through an interior controller of the interior assembly to verify if the input is a valid authentication code.

In Example 29, the subject matter of Example 28 is further configured by receiving the input at the interior controller and, in response to receiving the input, sending a confirmation that communication has been received to an exterior controller of the exterior assembly.

In Example 30, the subject matter of Example 29 is further configured by sending the confirmation of the valid authentication code in response to verifying that the input is valid and receiving the confirmation at the exterior controller and using an exterior output device to notify the user of a valid input.

In Example 31, the subject matter of Example 29 is further configured by sending the confirmation of an invalid authentication code in response to verifying that the input is invalid and receiving the confirmation at the exterior controller and using an exterior output device to notify the user of an invalid input.

In Example 32, the subject matter of Example 28 is further configured such that the communication between the interior wireless communication unit and the exterior wireless communication unit is encoded.

What is claimed is:

1. A method of operating an interior assembly of a lockset, the method comprising:

receiving signals from an exterior communication unit of an exterior assembly of the lockset at an interior wireless communication unit of the interior assembly;

transmitting a confirmation signal from the interior wireless communication unit of the interior assembly to the exterior communication unit of the exterior assembly;

in response to the exterior communication unit of the exterior assembly not receiving the confirmation signal, receiving the signals from the exterior communication unit of the exterior assembly at the interior wireless communication unit of the interior assembly a second time;

determining an authentication result indicating whether a valid authentication code was received based on the signals;

sending an authentication result to the exterior communication unit from the interior communication unit; and in response to determining that the valid authentication code was received, actuating the lockset according to the user input, wherein the exterior wireless communication unit and the interior wireless communication unit are configured to wirelessly communicate through a bore hole in a door when the locket is mounted on the door.

2. The method of claim 1, the method further comprising: determining that the signals include a warning condition; and presenting the warning condition via an interior output device of the interior assembly.

3. The method of claim 1, the method further comprising: decoding the signals at the interior assembly.

4. The method of claim 1, the method further comprising: receiving status updates at the interior communication unit from the exterior assembly via the exterior communication unit.

5. A method of operating a system for wirelessly communicating through a bore hole of a door, the method comprising:

receiving an input through at least one user interface on an exterior assembly for authentication of a user;

communicating the input from an exterior wireless communication unit of the exterior assembly therebetween the bore hole to an interior wireless communication unit of an interior assembly;

determining whether a confirmation signal is received at the exterior wireless communication unit from the interior wireless communication unit;

resending the input from the exterior wireless communication unit to the interior wireless communication unit when it is determined that the confirmation signal is not received; and authenticating the user through an interior controller of the interior assembly to verify if the input is a valid authentication code, wherein communication of the input between the exterior wireless communication unit and the interior wireless communication unit is encoded.

6. The method of claim 5, further comprising:

receiving the input at the interior controller; and sending, in response to receiving the input, a confirmation that communication has been received to an exterior controller of the exterior assembly.

7. The method of claim 6, further comprising:

sending a confirmation of the valid authentication code in response to verifying that the input is valid; and receiving the confirmation at the exterior controller and using an exterior output device to notify the user of a valid input.

8. The method of claim 6, further comprising:

sending a confirmation of an invalid authentication code in response to verifying that the input is invalid; and receiving the confirmation at the exterior controller and using an exterior output device to notify the user of an invalid input.

9. The method of claim 5, further comprising:

providing power wirelessly between the interior assembly and the exterior assembly through the bore hole via a light source of the interior assembly and a photovoltaic cell of the exterior assembly.

10. The method of claim 9, wherein the photovoltaic cell and the light source are configured for wirelessly communicating between the exterior and interior assemblies through the bore hole.

11. The method of claim 9, further comprising:

receiving, at the interior assembly from the exterior assembly, a low power indication for a power source in the exterior assembly; and activating the light source to charge the power source in response to receiving the low power indication.

12. The method of claim 5, the method further comprising:

in response to receiving the input through the at least one user interface, evaluating whether a warning condition is present; and sending the warning condition from the exterior wireless communication unit to the interior wireless communication unit when the warning condition is present.

13. A method of operating an exterior assembly of a lockset, the method comprising:

receiving an input at a user interface of the exterior assembly;

sending the input from an exterior wireless communication unit of the exterior assembly to an interior wireless communication unit of an interior assembly;

determining whether a confirmation signal is received at the exterior wireless communication unit from the interior wireless communication unit;

resending the input from the exterior wireless communication unit to the interior wireless communication unit when it is determined that the confirmation signal is not received; and receiving an authentication result at the exterior wireless communication unit from the interior wireless communication unit, wherein the exterior wireless communication unit and the interior wireless communication unit are configured to wirelessly communicate via signals wirelessly transmitted through a bore hole in a door when the locket is mounted on the door.

14. The method of claim 13, the method further comprising:

evaluating whether a warning condition is present; and sending the warning condition from the exterior wireless communication unit to the interior wireless communication unit when the warning condition is present.

15. The method of claim 14, wherein evaluating whether the warning condition is present is performed in response to receiving the input at the user interface.

16. The method of claim 14, wherein evaluating whether the warning condition is present is performed periodically.

17. The method of claim 13, wherein the signals are encoded.

18. The method of claim 13, the method further comprising: when it is determined that the confirmation signal is not received, providing a notification via an exterior output device of the exterior assembly indicating that the interior wireless communication unit did not receive the input.

19. The method of claim 13, the method further comprising:

presenting the authentication result via an exterior output device of the exterior assembly.

* * * * *